United States Patent
Chen et al.

(10) Patent No.: US 7,986,259 B2
(45) Date of Patent: Jul. 26, 2011

(54) MOTORCYCLE RADAR DETECTION SYSTEM

(75) Inventors: Wayne Chen, Los Angeles, CA (US); Adam Gold, New York, NY (US)

(73) Assignee: Adaptiv Technologies, LLC, New York, NY (US)

( * ) Notice: Subject to any disclaimer, the term of this patent is extended or adjusted under 35 U.S.C. 154(b) by 0 days.

(21) Appl. No.: 12/378,224

(22) Filed: Feb. 12, 2009

(65) Prior Publication Data

US 2010/0201560 A1  Aug. 12, 2010

(51) Int. Cl.
G01S 7/40 (2006.01)
H04K 3/00 (2006.01)
G01S 7/04 (2006.01)
G01S 13/00 (2006.01)

(52) U.S. Cl. ............ 342/20; 342/13; 342/175; 342/176; 455/1

(58) Field of Classification Search .............. 342/13–20, 342/89, 175, 195, 176, 179–184; 455/1; 248/121; 224/400, 412, 413; 439/214, 215, 439/502–506
See application file for complete search history.

(56) References Cited

U.S. PATENT DOCUMENTS

| | | | |
|---|---|---|---|
| 666,088 A | 1/1901 | Deitz | |
| 4,633,521 A * | 12/1986 | Liautaud | 342/20 |
| 4,656,564 A | 4/1987 | Felder | |
| 4,719,462 A * | 1/1988 | Hawkins | 342/20 |
| 4,981,243 A | 1/1991 | Rogowski | |
| 5,034,747 A * | 7/1991 | Donahue | 342/20 |
| 5,291,203 A * | 3/1994 | Schneck | 342/20 |
| 5,525,989 A * | 6/1996 | Holt | 342/20 |
| 5,684,488 A * | 11/1997 | Liautaud et al. | 342/20 |
| 5,771,305 A * | 6/1998 | Davis | 224/413 |
| 5,781,145 A * | 7/1998 | Williams et al. | 342/20 |
| 5,897,040 A | 4/1999 | Ward | |
| 6,080,014 A | 6/2000 | Steiler | |
| 6,378,815 B1 * | 4/2002 | Lee | 248/121 |
| 6,561,400 B2 * | 5/2003 | Lee | 224/413 |
| 6,572,249 B2 | 6/2003 | Bailey | |
| 6,783,040 B2 * | 8/2004 | Batchelor | 224/413 |
| 6,943,723 B2 * | 9/2005 | Kim et al. | 342/20 |
| 6,950,053 B1 * | 9/2005 | Peterson | 342/20 |
| 7,033,209 B2 * | 4/2006 | Swiatek et al. | 439/502 |
| 7,271,760 B2 * | 9/2007 | Bartosik et al. | 342/20 |
| 7,504,983 B2 * | 3/2009 | Chen et al. | 342/20 |
| 2004/0239553 A1 * | 12/2004 | Kim et al. | 342/20 |
| 2004/0262350 A1 * | 12/2004 | Batchelor | 224/413 |
| 2006/0178028 A1 * | 8/2006 | Swiatek et al. | 439/215 |
| 2007/0221694 A1 | 9/2007 | Aguiliar et al. | |
| 2008/0031002 A1 | 2/2008 | Venier | |

* cited by examiner

Primary Examiner — Bernarr E Gregory
(74) Attorney, Agent, or Firm — Raymond Sun (57) ABSTRACT

A radar detection system for use with a motorcycle includes a main console that includes a single I/O interface, a detector and a controller that transmits an alert signal upon the detection of a radar or laser by the detector. The radar detection system also includes a visual alert that receives the alert signal from the main console, and a display which provides a visual display of the alert signal, with the visual alert being mounted to a portion of a motorcycle. The radar detection system further includes a wiring harness having a plurality of I/O interfaces, including a first I/O interface that is removably coupled to the single I/O interface of the main console, and a second I/O interface that is removably coupled to the visual alert.

15 Claims, 9 Drawing Sheets

MOTORCYCLE RADAR DETECTION SYSTEM

BACKGROUND OF THE INVENTION

1. Incorporation by Reference

This application is related to application Ser. No. 11/707,476, filed Feb. 16, 2007, whose entire disclosure is incorporated by this reference as though set forth fully herein.

2. Field of the Invention

The present invention relates to a motorcycle radar detection system.

3. Description of the Prior Art

Most radar detectors are designed for use inside or with automobiles. Unfortunately, it is more challenging to adapt radar detectors and their components for use with motorcycles.

First, noise is a major problem, because the road noise cannot be insulated or blocked out. Wind and engine noises also pose similar problems. As a result, the motorcycle rider cannot hear audible alerts issued by the radar detector.

Second, the rider often cannot see visual alerts being emitted by the radar detector because the radar detector is often mounted at a location that is outside the rider's visual field. In addition, motorcycles also receive more direct sunlight than automobiles, and the direct sunlight can make it difficult for the rider to see the displays on the radar detector.

Third, riders often wear gloves when riding. The buttons on conventional radar detectors are small, so they are difficult to actuate when wearing gloves.

Fourth, mounting a radar detector and its components to a motorcycle can be challenging because one must find a location on a motorcycle that provides a good fit, is visually appealing, and does not interfere with the rider's operation of the motorcycle.

Fifth, waterproofing can also be a problem. Conventional automobile radar detectors are not waterproof, and are therefore not well suited for use with motorcycles.

SUMMARY OF THE DISCLOSURE

It is an object of the present invention to provide a radar detection system that can conveniently and effectively be used with a motorcycle.

In order to accomplish the objects of the present invention, the present invention provides a radar detection system for use with a motorcycle. The radar detection system includes a main console that includes a single I/O interface, a detector and a controller that transmits an alert signal upon the detection of a radar or laser by the detector. The radar detection system also includes a visual alert that receives the alert signal, and a display which provides a visual display of the alert signal, with the visual alert being mounted to a portion of a motorcycle. The radar detection system further includes a wiring harness having a plurality of I/O interfaces, including a first I/O interface that is removably coupled to the single I/O interface of the main console, and a second I/O interface that is removably coupled to the visual alert.

In another embodiment of the present invention, a mounting assembly is provided to secure the main console to a portion of the motorcycle, and a quick-release mechanism is incorporated on the main console and the mounting assembly to allow the main console to be quickly and easily secured to and removed from a support bracket of the mounting assembly.

In yet another embodiment of the present invention, the visual alert includes a housing that has two flexible wings that extend on opposite sides of the housing, each wing having a groove. The visual alert is mounted to a portion of a motorcycle via the wings.

In yet a further embodiment of the present invention, the radar detection system includes a laser sensor/jammer system.

In yet a further embodiment of the present invention, the radar detection system includes an audio indicator having a receiver module and a speaker that is communicatively coupled to the receiver module, the receiver module having a receiver that receives the alert signal from the main console.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
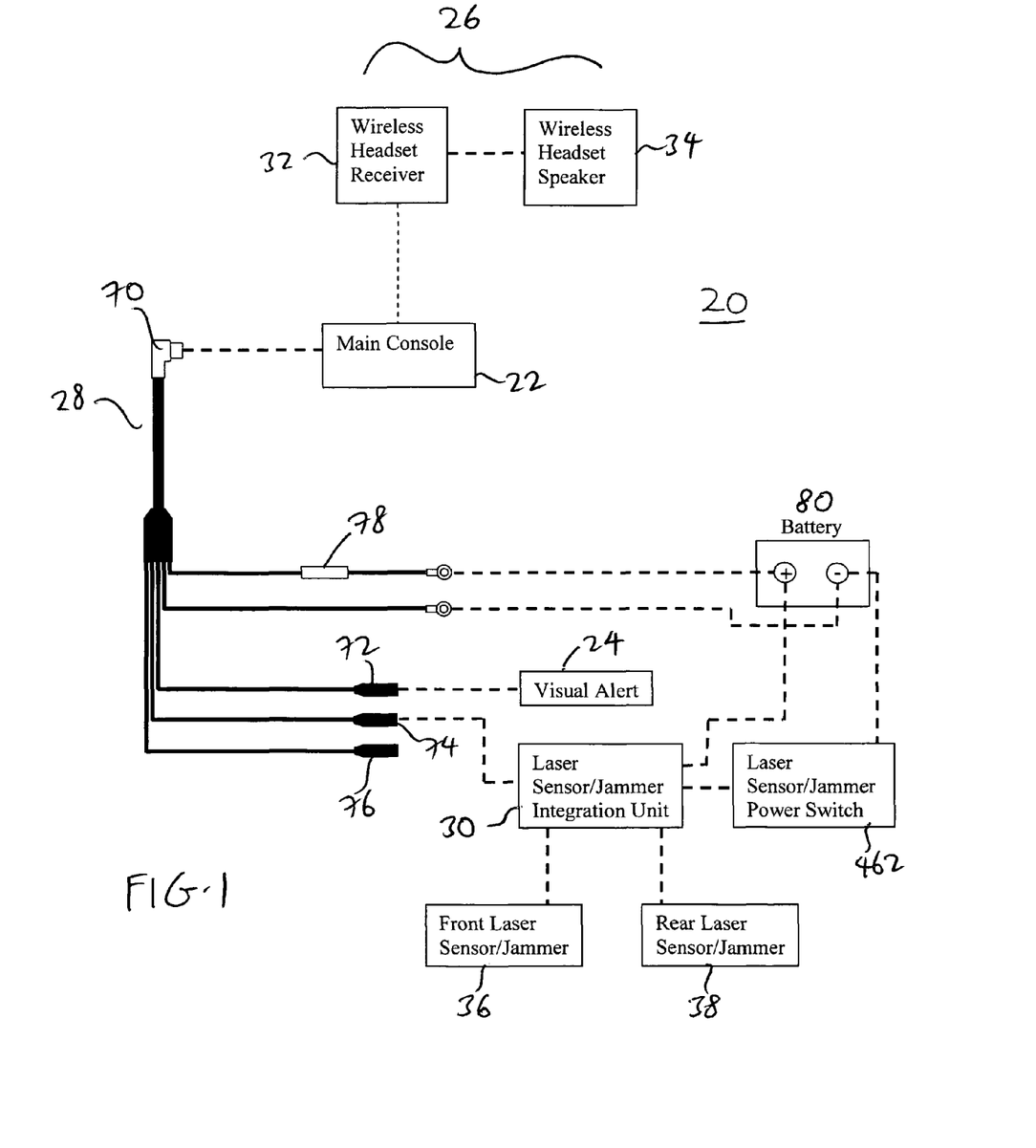
FIG. 1 is a schematic block diagram illustrating the components of the radar detection system according to one embodiment of the present invention.
Figure 2:
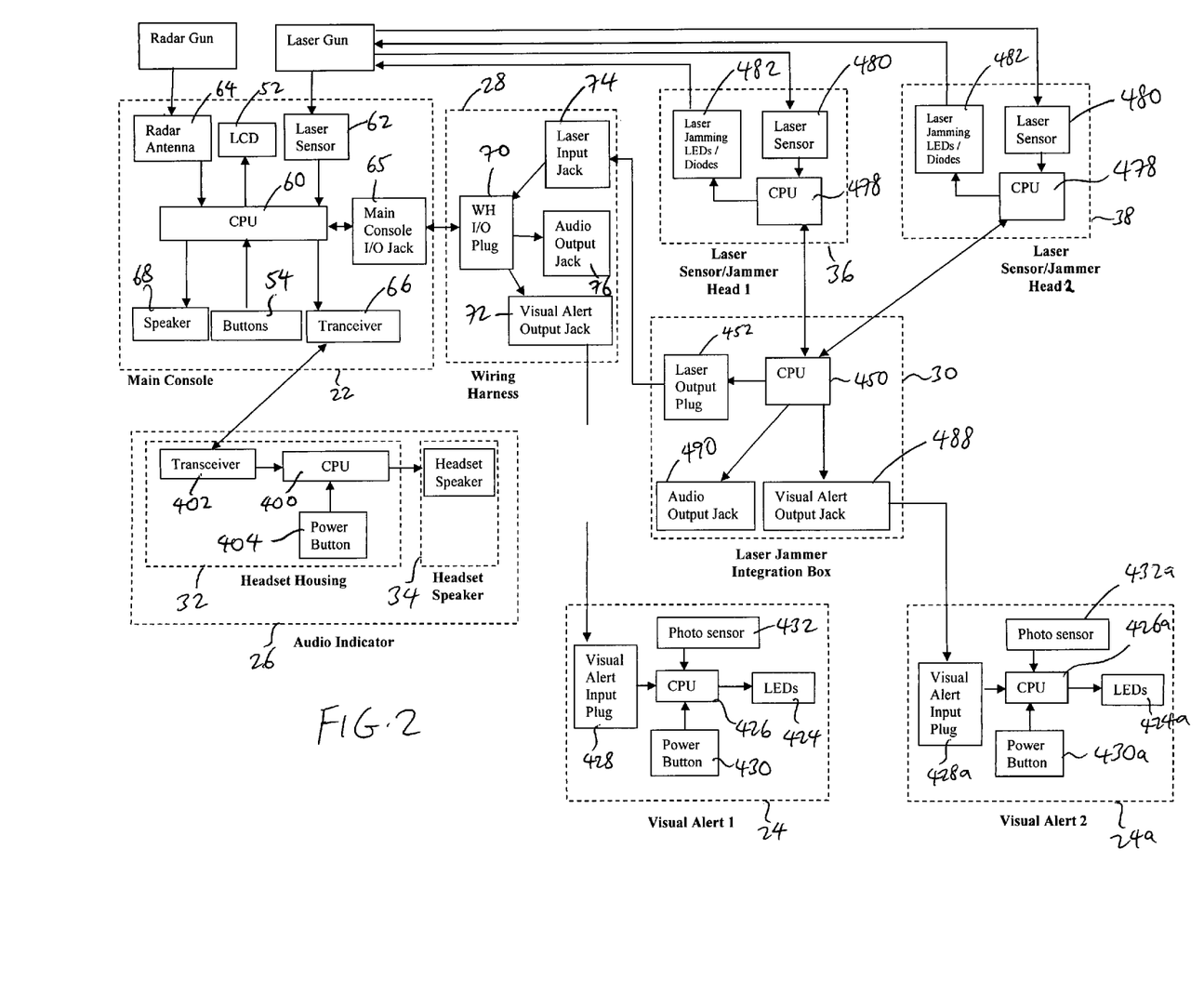
FIG. 2 is a schematic block diagram illustrating the electronics of the system shown in FIG. 1.

FIGS. 1-2 illustrate one embodiment of a radar detection system 20 according to the present invention. The system 20 includes a main console 22, a visual alert 24, an audio indicator 26, a wiring harness 28, and a laser sensor/jammer assembly. The audio indicator 26 includes a receiver module 32 and a speaker 34. The laser sensor/jammer assembly includes an integration unit 30, a front laser sensor/jammer head 36 and a rear laser sensor/jammer head 38.

Figure 7:
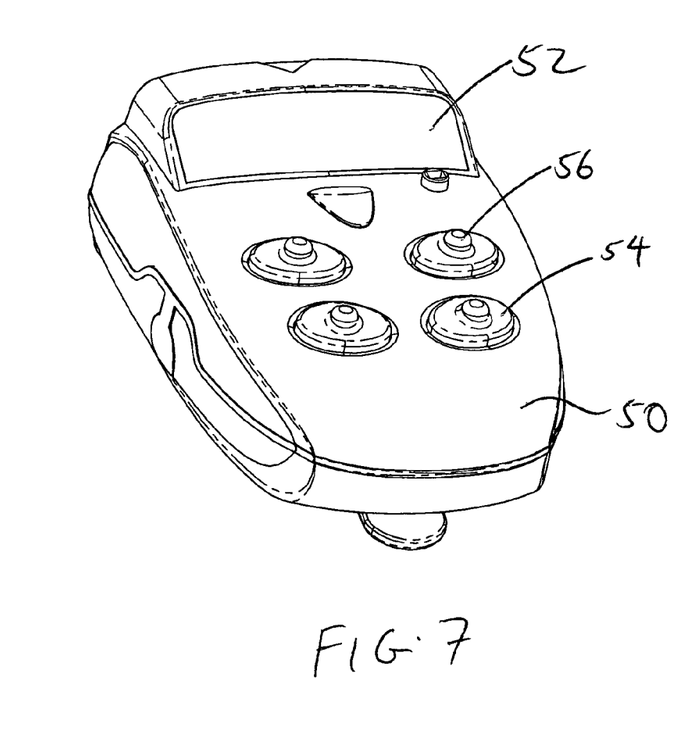
FIG. 7 is a perspective view of the main console of FIG. 3 showing a modification thereto.

The main console 22 operates in the same manner as a conventional automobile radar detector. Referring to FIGS. 2-6, the main console 22 has a housing 50 (which can be made of two housing pieces), with an LCD display 52 provided at an angled orientation on the top surface of the housing 50 to allow for convenient viewing by a rider, or even in an automobile. The LCD display 52 is adapted to display important information such as modes, signals detected, volume, etc. The LCD display 52 is positioned at the distal end of the housing 50 at an angle of approximately 30 degrees to the horizontal. It was determined that this angle provides the optimum position for viewing on a sportbike or cruiser, while still allowing for viewing on a dashboard of an automobile. A plurality of buttons 54 are provided in spaced-apart manner on the top surface of the housing 50. The buttons 54 can be made very large (e.g., with a surface area of about 0.21 square inches) so that they can be easily sensed and pressed by a rider wearing gloves. Alternatively, as shown in FIG. 7, a nipple 56 can be provided on the top surface of the buttons 54 to provide a tactile feel that can be sensed by the rider's finger through the gloves. The nipple 56 is especially suited for use with smaller buttons where the rider's finger may have more difficulty in sensing and pressing the smaller button. Even though FIG. 7 shows the nipple 56 used with a larger button, this is not necessary as the large button 54 in FIG. 3 does not require the nipple 56 because of its larger size.

Figure 3:
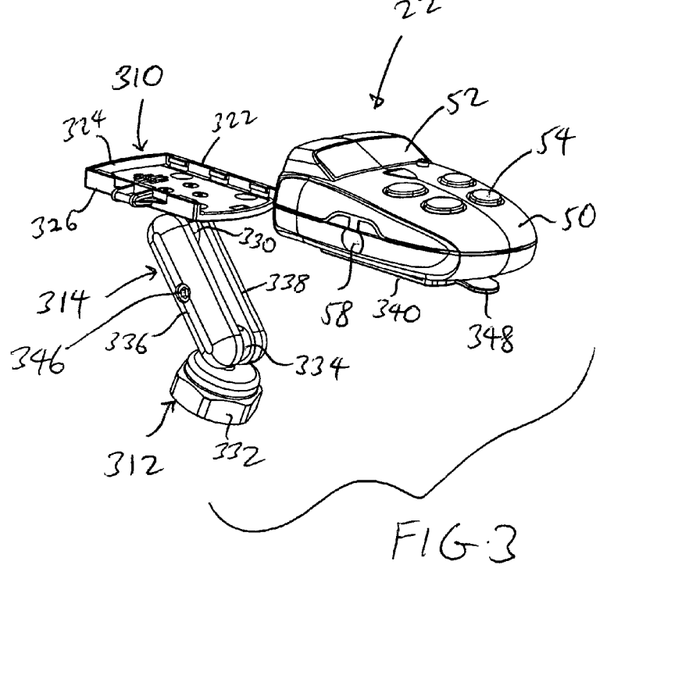
FIG. 3 is an exploded perspective view of the main console and the mounting assembly of the system of FIG. 1.

The main console 22 has a single input-output jack 65 on the side of the housing 50, with the jack covered by a jack cover 58. The single jack 65 is adapted to receive the single plug 70 from the wiring harness 28, as described below. Providing a single jack in the main console 22 reduces wire clutter on the motorcycle where space is limited, and promotes convenience in that only one connection needs to be plugged or unplugged when removing or attaching the main console 22. As an alternative, the system of the present invention can be modified so that the single plug 70 can be plugged into the support bracket 310, or even be permanently connected to the support bracket 310. Contacts can then be provided on the support bracket 310 and the main console 22, and these contacts can be connected for the exchange of data and power when the main console 22 is slid on to the support bracket 310.

The housing 50 is designed to be water-resistant by providing a rubber gasket between the two housing pieces. The buttons 54 are also made of rubber and inserted into wells using an interference fit. A rubber gasket can be sandwiched between the jacks and the inside of the housing 50. Other plastic components can be ultrasonically welded or heat staked to maximize the waterproofing.

The main console 22 also houses the electronics for the radar detector, including a controller (CPU) 60, a laser sensor 62 and a radar antenna 64. The laser sensor 62 is adapted to receive conventional laser signals from a laser gun, and the radar antenna is adapted to receive conventional microwave radar signals from a radar gun. The laser sensor 62 and the radar antenna 64 are coupled to the controller 60 to provide these signals to the controller 60, and can be embodied in the form of any of the conventional laser sensors and radar antennas that are available in the marketplace. A transceiver 66 (e.g., an antenna) is coupled to the controller 60 to transmit the necessary signal to the wireless headset receiver module 32. A speaker 68 is coupled to the controller 60 for broadcasting an audible beep or other audio indication to warn the rider that a police radar is nearby. The actual speaker 68 is not shown in FIG. 3, but is located at a hole at the bottom of the housing 50. A film can be placed over the speaker at the location of the speaker hole to provide the needed waterproofing. However, since the audible beep may be drowned out by the road noise encountered by a rider on a motorcycle, the separate visual alert 24 and audio indicator 26 are provided to alert the rider.

The wiring harness 28 has a single plug 70 (see FIG. 1) that is coupled to the controller 60 via the jack 65. Five lines extend from the plug 70. A first line couples the plug 70 with a visual alert output jack 72, which is in turn coupled to the controller (CPU) 426 of the visual alert 24 (via the visual alert input plug 428) to provide signals to the visual alert 24. A second line couples the plug 70 with a laser input jack 74, which is in turn coupled to the controller (CPU) 450 of the laser sensor/jammer integration unit 30 (via the laser output plug 452) for receiving signals from the laser sensor/jammer integration unit 30. A third line couples the plug 70 with an audio output jack 76. A variety of different devices can be coupled to the audio output jack 76. For example, some riders use a communication system to communicate with other riders, which includes speakers within a rider's helmet. These communication systems can operate like a two-way radio, and use an existing headset that would allow the main console 22 to be integrated with an already-existing communication system. One example is the GMRS X1 made by Chatterbox. Another device that can be plugged into the audio output jack is a BLUETOOTH™ adapter, which is a small electronic device that usually plugs into non-BLUETOOTH™ phones so that they can be used with BLUETOOTH™ headsets. Plugging a BLUETOOTH™ adapter into the main console 22 would allow the rider to use a BLUETOOTH™ headset to receive alert signals. A fourth line couples the plug 70 to a fuse 78 that is in turn coupled to a positive terminal of the motorcycle battery 80. A fifth line couples the plug 70 to a negative terminal of the motorcycle battery 80. The fourth and fifth lines function to deliver power to the main console 22.

Figure 4:
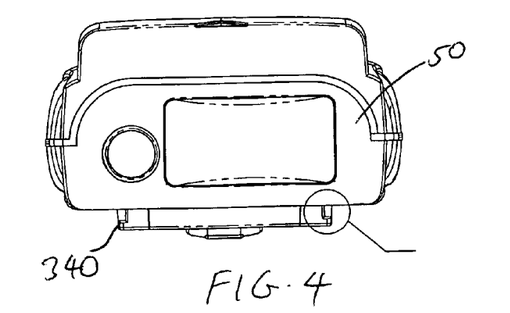
FIG. 4 is a rear view of the main console of FIG. 3.
Figure 5:
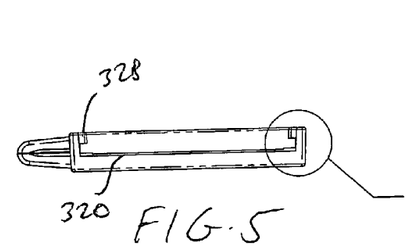
FIG. 5 is a cross-sectional view of the support bracket of FIG. 3 viewed from the front thereof.
Figure 6:
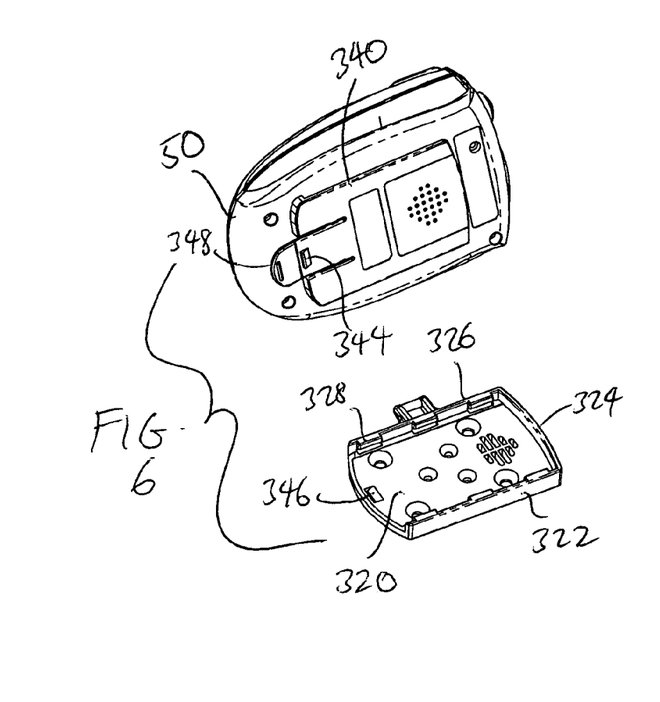
FIG. 6 is an exploded bottom perspective view of the main console and the support bracket of FIG. 3.

Although not shown in FIG. 4, those skilled in the art will appreciate that the main console 22 can be powered by external batteries (not shown) instead of being wired to the motorcycle's power source.

Figure 14A:
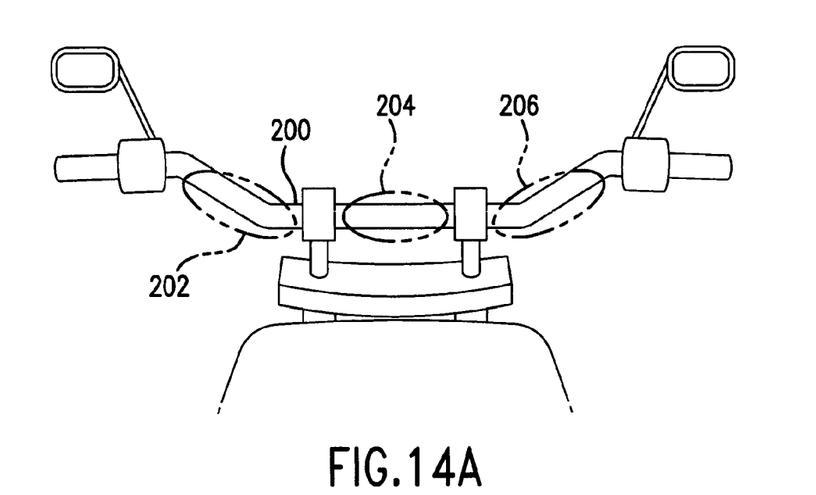
FIGS. 14A-14B illustrate various locations on a motorcycle where a mounting assembly can be mounted.
Figure 14B:
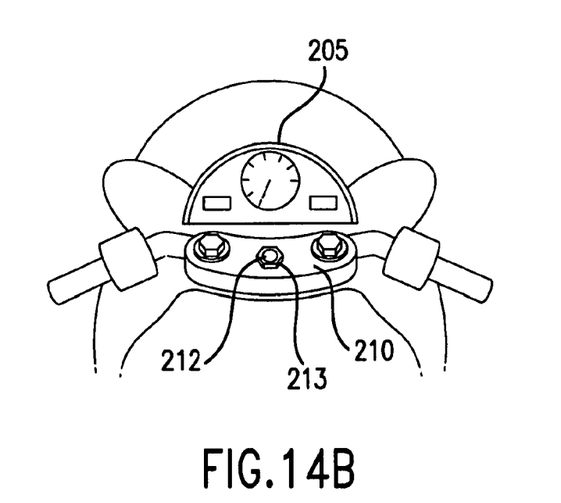

FIGS. 14A-14B illustrate the locations where mounting assemblies for the components of the system 20 can be mounted to a motorcycle. FIG. 14A illustrates the handlebar 200 of a conventional motorcycle. The mounting assembly can be secured to any of the locations indicated by the circled regions 202, 204 and 206 along the handlebar 200. FIG. 14B illustrates the steering bridge 210 of a conventional motorcycle. The bridge 210 has a steering stem 212 that is surrounded by a nut 213. The mounting assembly can be secured to the steering bridge 210 by replacing the stock steering stem nut 213.

FIGS. 3-7 illustrate a mounting assembly 300 that can be mounted to the location of the stem 212 in FIG. 16B by removing the nut 213 at the stem 212. The mounting assembly 300 has a support bracket 310, a nut mount 312, and a link 314 that pivotably couples the bracket 310 to the nut mount 312. The bracket 310 has a planar base 320, and three side walls 322, 324, 326. Short extensions 328 extend inwardly from the side walls 322, 326 to define two opposing rail tracks. A ball 330 extends from the bottom of the base 320. The nut mount 312 has a hexagonal body 332 that has internal threads (not shown) that are adapted to be threadably engaged to the steering stem 212 of the motorcycle in place of the nut 213. A ball 334 extends from the top of the body 332. The link 314 has two separate link pieces 336 and 338. Each link piece 336, 338 has a hemispherical recess (not shown) provided on its inner surface at its top end and at its bottom end. The ball 330 is adapted to be received for pivoting motion inside the recesses at the top ends, and the ball 334 is adapted to be received for pivoting motion inside the recesses at the bottom ends. A screw 346 extends through threaded openings provided at about the center of the link pieces 336, 338 to secure the link pieces 336, 338 together.

Referring to FIGS. 4-7, the bottom of the housing 50 of the main console 22 has a set of opposing L-shaped flanges 340 that are adapted to be slid under the extensions 328 of the side walls 322 and 326. As the housing 50 is slid on to the bracket 310, the tooth 344 on the bottom of a tongue 348 at the bottom of the housing 50 will eventually engage a notch 346 on the base 320 of the bracket 310 to secure the main console 22 to the bracket 310 of the mounting assembly 300. To remove the main console 22 from the bracket 310, the user presses the tongue 348 upwardly to cause the tooth 344 to be disengaged from the notch 346 so that the housing 50 can be slid out of the bracket 310 along the rails 328. The rails 328, the flanges 340, the tongue 328, the tooth 344 and the notch 346 together provide a quick-release mechanism for securing and removing the main console 22 to the bracket 310. In use, the nut mount 312 is threadably secured to the steering stem 212 of the motorcycle after the nut 213 has been removed, and the pivoting ball joints at the balls 330, 334 allow the bracket 310 to be positioned at any desired orientation or angle with respect to the steering stem 210.

Figure 10:
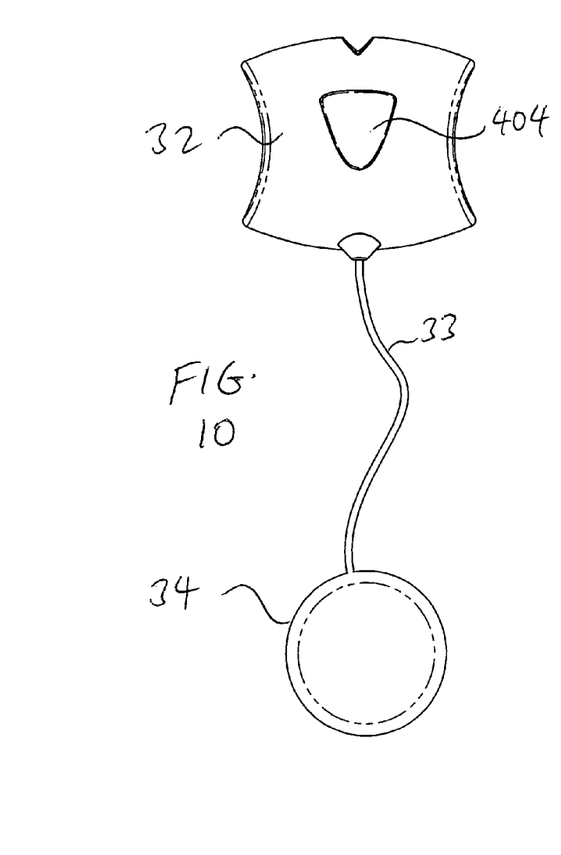
FIG. 10 illustrates the audio indicator of the system of FIG. 1.
Figure 11:
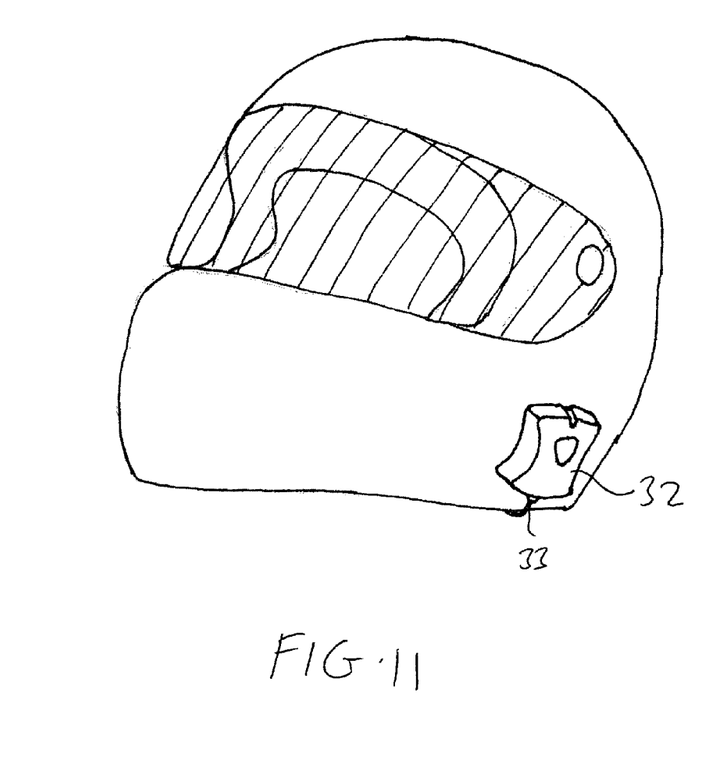
FIG. 11 illustrates how the audio indicator of FIG. 10 can be used.

Referring to FIGS. 2 and 10, the audio indicator 26 includes a receiver module 32 and a speaker 34 that are coupled together by a wire 33. The receiver module 32 can be mounted to the outside of the rider's helmet using VELCRO™, double-sided tape, hooks, or other similar attachment mechanisms. The speaker 34 can be mounted inside the helmet (using similar attachment mechanisms) adjacent the rider's ear (see FIG. 11). The wire 33 couples the receiver module 32 and the speaker 34, such as by feeding the wire 33 between the soft inner foam and hard outer shell of the helmet. The receiver module 32 houses a controller (CPU) 400 that is coupled to a transreceiver 402 (e.g., an antenna) and a power button 404 that is used to turn the receiver module 20 on and off. A coin-cell battery (not shown) can also be provided inside the receiver module 20 and coupled to the controller 400 to power the audio indicator 26. When the main console 22 detects a radar or laser signal, it transmits (via the transceiver 66) the information to the controller 400 via the transreceiver 402, which in turn causes the speaker 34 to emit a warning signal to the rider. The pitch and frequency of the warning signal can vary depending on the signal strength and type (e.g., K band, Ka band, X band, laser). The housing of the receiving module 32 can be made water-resistant in the same manner as the housing 50 described above. The receiver module 32 can even include a transmitter (not shown) so as to enable bi-directional communication such as BLUETOOTH™.

Figures 8, 9:
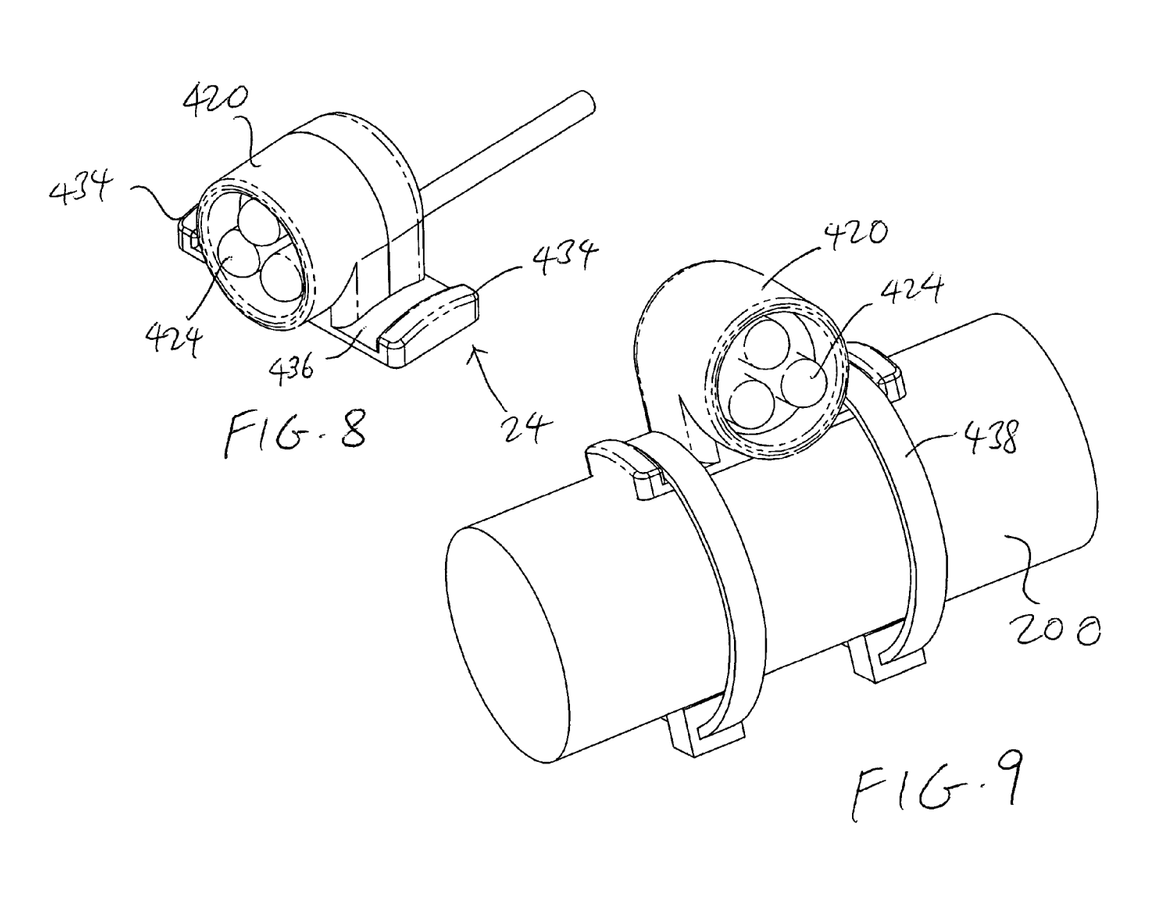
FIG. 8 is a perspective view of the visual alert of the system of FIG. 1.
FIG. 9 is a perspective view of the visual alert of FIG. 8 shown secured to a handlebar of a motorcycle.

Referring to FIGS. 2, 8 and 9, the visual alert 24 can be mounted to the handlebar 200 at any of the circled regions 202, 204 and 206 shown in FIG. 14A. The visual alert can also be mounted on top of any of the gauges (e.g., 205 in FIG. 14B) using double-sided adhesive tape, or on any part of the motorcycle that is within the rider's field of vision, such as the windscreen, mirrors, etc. The housing 420 of the visual indicator 24 is generally cylindrical and can be water-resistant in the same manner as the housing 50 described above. A plurality of light-emitting diodes (LEDs) 424 are provided inside the cylindrical space of the housing 420. The visual alert 24 houses a controller (CPU) 426 that is coupled to an input plug 428 that is adapted to receive the visual alert output jack 72. The controller 426 is also coupled to an optional power button 430 that is used to turn the visual alert 24 on and off. When the main console 22 detects a radar or laser signal, it transmits (via the wiring harness 28) the information to the controller 426 via the jacks 65, 72 and the plugs 70, 428, which in turn causes the LEDs 424 to light up or flash, thereby alerting the rider. The LED flash frequency can correlate to the strength of the detected signal and the type of signal. The LEDs 424 can also flash in different colors to indicate different radar bands, lasers, and the like.

In addition, extremely bright LEDs 424 are necessary in order for the flashing to be visible to the rider in daylight. However, high intensity flashing of the LEDs 424 at night can be distracting and dangerous, so a photosensor 432 can be incorporated with the visual alert 24, and cooperates with the controller 426, to adjust the intensity of the LEDs 424 to appropriate levels depending on whether it is daytime or nighttime. The user can also manually control the intensity level using the buttons 54 on the main console 22.

As an alternative, the photosensor 432 can be provided in the main console 22 and cooperates with the controller 60, to adjust the intensity of the LEDs 424 to appropriate levels depending on whether it is daytime or nighttime. The user can also manually control the intensity level using the buttons 54 on the main console 22.

As an alternative, the visual alert 24 can be embodied in its simplest configuration by omitting the controller 426, the power button 430 and the photosensor 432, so that the input plug 428 is connected directly to the LEDs 424. In this simplified embodiment, the controller 60 from the main console 22 would actually be controlling the flashing operation of the LEDs 424 upon the detection of a radar or laser signal.

The visual alert 24 also includes two flexible wings 434 that extend on opposite sides of the housing 420. Each wing 434 is preferably made from a flexible yet durable material such as a thermoplastic elastomer. Each wing 434 has a groove 436. FIG. 9 shows the wings 434 wrapped around the handlebar 200, with cable ties 438 received inside the grooves 436 and tied to secure the wings 434 to the handlebar 200. The flexibility of the wings 434 allows the visual alert 24 to be mounted on to curved surfaces, such as the top surface of a gauge, or the windscreen, with the flexibility of the wings 434 allowing the wings 434 to be wrapped around or flexed to conform to the curved surface.

Figure 12:
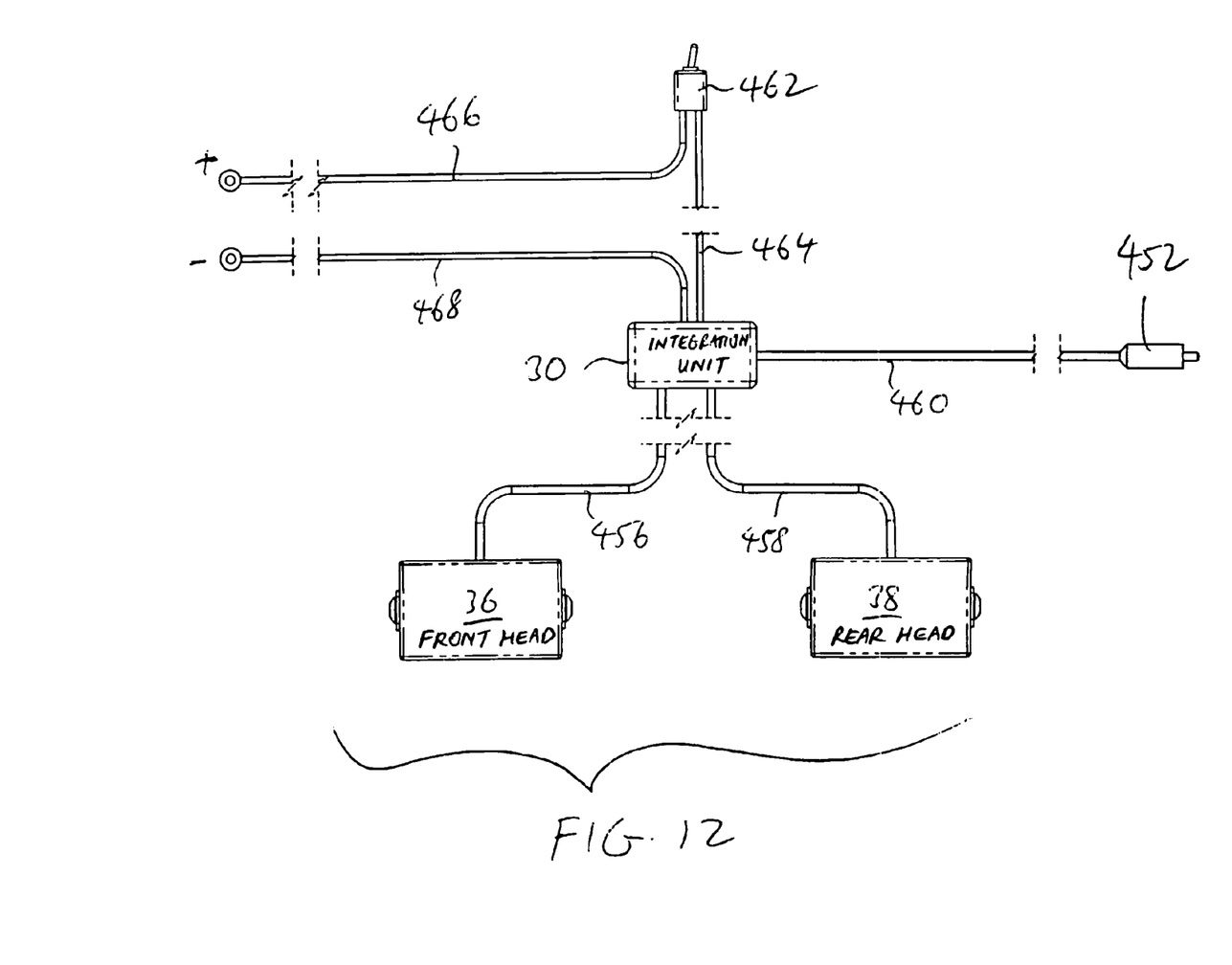
FIG. 12 illustrates the laser sensor/jammer assembly of the system of FIG. 1.
Figure 13:
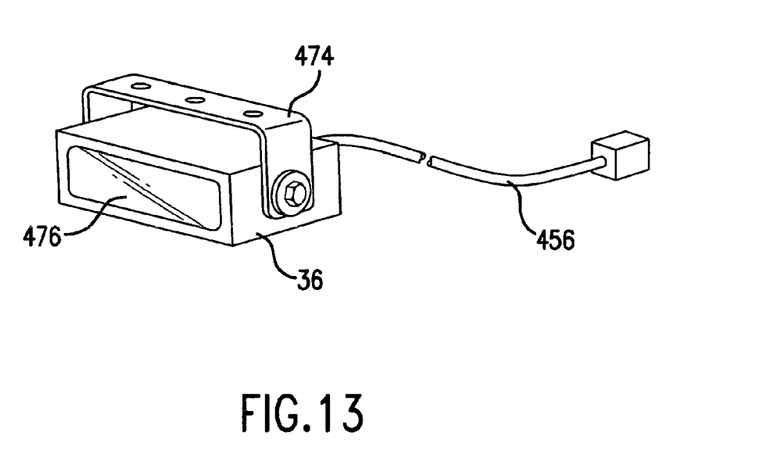
FIG. 13 is a perspective view of a laser sensor/jammer head of the laser sensor/jammer assembly of FIG. 12.

FIGS. 2, 12 and 13 illustrate a laser sensor/jammer assembly that can be configured for use with the system of FIG. 1. The assembly shown in FIGS. 2, 12 and 13 includes an integration unit 30, a front laser sensor/jammer head 36 and an optional rear laser sensor/jammer head 38. The integration unit 30 has a controller (CPU) 450 that is coupled to a laser output plug 452 via wiring 460, which is in turn adapted to be plugged into the laser input jack 74 of the wiring harness 28. Each head 36 and 38 is connected via wiring 456 and 458, respectively, to the controller 450 of the integration unit 30. A power switch 462 is connected to the integration unit 30 via wiring 464. Additional wirings 466 and 468 connect the positive and negative terminals, respectively, of the battery 80 to the power switch 462 and the integration box 30, respectively. An audio output jack 490 can be provided on the integration unit 30, and can be utilized in the same manner as the audio output jack 76. In addition, a visual alert output jack 488 can also be provided on the integration unit 30 and used in a similar manner. The audio output jack 490 and the visual alert output jack 488 give the user the option of using the laser sensor/jammer assembly as a stand-alone system. The laser output plug 452 allows for the laser sensor/jammer assembly to be integrated with the radar system of FIG. 1.

Figure 15:
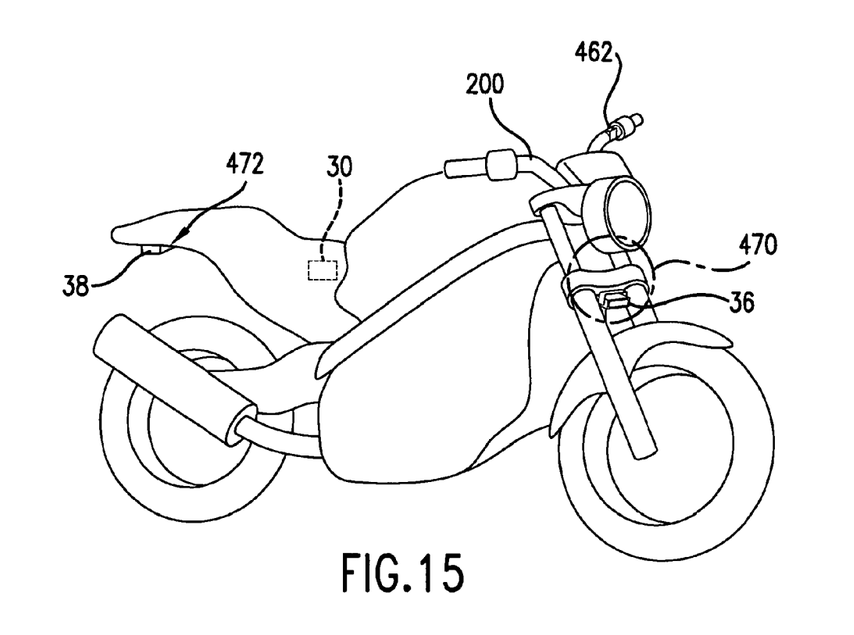
FIG. 15 illustrates the locations on a motorcycle for the various components of the laser sensor/jammer assembly of FIG. 12.

Referring to FIG. 13, the two laser sensor/jammer heads 36 and 38 can be identical, with the head 36 used as a front head 36, and the head 38 can be used as a rear head 38. Each head 36, 38 is configured as a housing with a window 476. A support bracket 474 is secured to the housing of the head 36, 38 by screws. Inside each head 36, 38 can be provided a controller (CPU) 478 that is coupled to a laser sensor 480 and laser jamming diodes 482 that are positioned adjacent the window 476. These diodes 482 can also embodied in the form of LEDs. Referring to FIG. 15, the front head 36 can be secured under the lower triple clamp of the motorcycle in the area designated by the circle 470, by screwing the bracket 474 to the lower triple clamp. The rear head 38 can be secured to the rear fairing 472 of a motorcycle, or to the rear license plate cover. The power switch 462 can be secured to the handlebar 200.

Referring to FIGS. 1, 2 and 12, in operation, the laser sensors 480 at the heads 36, 38 are adapted to detect a laser radar signal. Upon detection of a laser radar signal (which is usually in the form of a pulse train of light), the controller 478 at the particular head 36, 38 will cause the jamming diodes 482 to send out another pulse train of light to the laser gun that prevents the laser gun from determining the speed of the vehicle. The controller 478 at the particular head 36, 38 will also cause a warning signal to be transmitted to the controller 450 at integration box 30, which can transmit the warning signal to the main console 22 via the wiring harness 28 (via plug 452, jack 74, plug 70 and jack 65), where the controller 60 can trigger the audio indicator 26 and the visual alert 24.

As an alternative, the controller 450 at integration box 30 can directly transmit the warning signal to another visual alert 24a via another visual alert output jack 488. The other visual alert 24a can be identical to the visual alert 24, and can be secured to the handlebar, the top of the gauges, or anywhere else on the motorcycle. The controller 426a, the input plug 428a, power button 430a, LEDs 424a and photo sensor 432a can be the same as the corresponding elements in the visual alert 24. In this embodiment, the laser sensor/jammer assembly can be used as a simple stand-alone radar detection system without the need to include the main console 22. The audio output jack 490 further facilitates the laser sensor/jammer assembly being used as a simple stand-alone radar detection system without the need to include the main console 22 because the audio output jack 490 allows for alerting of the rider through a means different from the visual alert 24a (which is communicated through the jack 488).

As used herein, the terms "plug", "jack" and "contact" are interchangeable. For example, the single plug 70, or any of the other plugs 70, 452, 428, can be a jack, and any of the jacks 65, 72, 74, 76, 490 can be a plug. For this reason, the term "input/output (I/O) interface" as used herein shall refer to either a jack, a plug or a contact.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A radar detection system for use with a motorcycle, comprising:
    a main console that includes a detector and a controller having a transmitter that transmits an alert signal upon the detection of a radar or laser by the detector, the main console having a single input/output (I/O) interface;
    a visual alert device that receives the alert signal from the main console, and a display which provides a visual display of the alert signal, the visual alert device being mounted to a portion of a motorcycle; and
    a wiring harness having a plurality of I/O interfaces, including a first I/O interface that is removably coupled to the single I/O interface of the main console, and a second I/O interface that is removably coupled to the visual alert device.

2. The system of claim 1, wherein the plurality of I/O interfaces on the wiring harness also includes an audio output jack.

3. The system of claim 2, further including:
    a laser sensor/jamming assembly that includes an integration unit and a laser sensor/jammer head coupled to the integration unit, with the plurality of I/O interfaces on the wiring harness also includes a laser input I/O interface coupled to the integration unit;
    a power supply, with the plurality of I/O interfaces on the wiring harness also including at least one I/O interface that is coupled to the power supply;
    an audio indicator coupled to the main console via a wireless interface, the audio indicator including a headset receiver and a speaker that is communicatively coupled to the receiver;
    means for adjusting the intensity of the visual display; and
    wherein the main console includes a display that is positioned at an angle to the top surface of the main console.

4. The system of claim 3, wherein:
    (i) the main console has a housing that includes:
        a bottom surface;
        a set of opposing flanges positioned on the bottom surface of the housing;
        a tongue extending from the bottom surface of the housing, with a tooth provided on the tongue; and
    (ii) the system further including a support bracket that is secured to a portion of a motorcycle, the support bracket having opposite rails that receive the opposing flanges, and a notch that receives the tooth to secure the housing of the main console on the support bracket.

5. The system of claim 4, wherein the main console includes a plurality of buttons, with each button having a nipple provided thereon.

6. The system of claim 4, wherein the main console includes a plurality of buttons, with each button having a surface area of about 0.21 square inches.

7. The system of claim 1, further including means for adjusting the intensity of the visual display.

8. The system of claim 1, further including a mount coupled to the visual alert device for attaching the visual alert device to a portion of a motorcycle.

9. The system of claim 1, wherein the main console includes a display that is positioned at an angle to the top surface of the main console.

10. The system of claim 1, further including:
    a laser sensor/jamming assembly that includes an integration unit and a laser sensor/jammer head coupled to the integration unit; and
    wherein the plurality of I/O interfaces on the wiring harness also includes a laser input jack coupled to the integration unit.

11. The system of claim 1, further including a power supply, and wherein the plurality of I/O interfaces on the wiring harness also includes at least one jack that is coupled to the power supply.

12. The system of claim 1, further including an audio indicator coupled to the main console via a wireless interface, the audio indicator including a headset receiver and a speaker that is communicatively coupled to the receiver.

13. The system of claim 1, wherein:
    (i) the main console has a housing that includes:
        a bottom surface;
        a set of opposing flanges positioned on the bottom surface of the housing;
        a tongue extending from the bottom surface of the housing, with a tooth provided on the tongue; and (ii) the system further including a support bracket that is secured to a portion of a motorcycle, the support bracket having opposite rails that receive the opposing flanges, and a notch that receives the tooth to secure the housing of the main console on the support bracket.

14. The system of claim 1, wherein the main console includes a plurality of buttons, with each button having a nipple provided thereon.

15. The system of claim 1, wherein the main console includes a plurality of buttons, with each button having a surface area of about 0.21 square inches.

\* \* \* \* \*